United States Patent [19]
Crawford, Sr. et al.

[11] Patent Number: 5,629,104
[45] Date of Patent: May 13, 1997

[54] MODULAR ELECTRICAL ENERGY DEVICE

[75] Inventors: Michael D. Crawford, Sr., Rochester Hills; Curt L. Wilson, Detroit; Michael H. Crawford, Jr., Rochester Hills; Matthew Gostek, Sterling Heights, all of Mich.

[73] Assignee: Detroit Center Tool, Detroit, Mich.

[21] Appl. No.: 343,850

[22] Filed: Nov. 23, 1994

[51] Int. Cl.⁶ .................................................. H01M 2/00
[52] U.S. Cl. .................................................. 429/34
[58] Field of Search .................. 429/34, 35, 30, 429/38, 37, 12

[56] References Cited

U.S. PATENT DOCUMENTS

| | | | |
|---|---|---|---|
| 3,134,696 | 5/1964 | Douglas | 429/30 |
| 3,278,336 | 10/1966 | Uline | 429/35 |
| 3,320,092 | 5/1967 | Uline | 429/35 |
| 4,366,211 | 12/1982 | Pollack | 429/38 |
| 4,444,851 | 4/1984 | Maru | 429/26 |
| 4,588,660 | 5/1986 | Shimizu | 429/35 |
| 5,176,966 | 1/1993 | Epp | 429/26 |
| 5,300,370 | 4/1994 | Washington | 429/34 |

*Primary Examiner*—Kathryn Gorgos
*Assistant Examiner*—Brendan Mee
*Attorney, Agent, or Firm*—Dinnin & Dunn, P.C.

[57] ABSTRACT

A modular energy device for combining fuel cells for use in an automotive vehicle. The modular energy device includes an end plate, a bi-plate, and compression plate. The modular energy device further includes current collectors which collect energy from an electrochemical reaction. A Membrane Electrode Assembly (MEA) or fuel cell includes a composite material, an anode and a cathode. The modular energy device uses a hydrogen based fuel and oxidant in order to create an electrical potential.

10 Claims, 9 Drawing Sheets

MODULAR ELECTRICAL ENERGY DEVICE

BACKGROUND OF THE INVENTION

1. Field of the Invention

The present invention relates generally to a modular energy device for combining fuel cells to create a chemical reaction to generate electrical energy and a method of manufacturing a modular energy device, and more particularly to a direct methanol liquid feed system.

2. Description of the Related Art

The technology for fuel cells has been around for numerous years. The first fuel cells were used by Sir William Grove in 1838. A fuel cell is a type of electric battery which uses an electro-chemical reaction to generate the electricity. The fuel cells tend to run more cleanly and efficiently than the other methods currently used to produce energy, such as hydroelectricity plants, nuclear plants or thermoelectric generators, which use moving water, nuclear reactions or steam to generate electricity. A fuel cell works by placing an anode and cathode within an electrolyte solution. The gas or solution passes through the electrodes, causing a chemical reaction which creates electrical potential between the cathode and anode. The byproducts of the reaction within the fuel cell are generally benign, depending on the fuel source. A methanol fuel cell produces water and carbon dioxide ($CO_2$) as byproducts.

Fuel cells have been used in a variety of applications to generate electricity. The most anticipated application is in the automotive industry. Fuel cells have been used on space craft and submarines because they are very efficient and do not cause a problem with emissions. To date fuel cells have not been practical for use in automotive vehicles because of their exorbitant costs and the weight associated with having a fuel cell large enough to operate a car at the average speed and mileage range of an internal combustion engine automobile. Since a fuel cell generates energy more efficiently than an internal combustion engine, the cost of operating an automobile with a fuel cell power source would be proportionally less than operating an internal combustion engine automobile. Additionally, fuel cells may be operated with a variety of renewable fuel sources which are competitively priced fuels and should become more cost advantageous over time relative to non-renewable petroleum products.

Construction of a fuel cell power source has to date been labor intensive and very costly. Prior art in the field has focused on the fuels and the chemical reactions necessary to produce the necessary energy whereas few patents and/or other technology has focused on the actual construction of a commercially feasible power source.

In order to generate a commercially feasible quantum of energy, multiple fuel cells are typically combined in a device, structurally attached to be enclosed in a single system. However, these devices are typically sealed systems and cannot typically be taken apart to repair or replace any individual fuel cell. Further, such multiple units have not been designed for commercial use or production. Existing multiple units do not contemplate weight restrictions, the need for mass assembly, or the use of cost-efficient components and manufacturing processes. Thus, there is a need in the art for a commercially feasible modular energy device for use in combining fuel cells.

One object of the present invention is to provide a novel method and apparatus for a modular energy device for combining fuel cells.

Another object of the present invention is to provide a light weight and easily replaceable modular energy device assembly.

Another object of the present invention is to provide a low cost manufacturing and processing alternative for making a modular energy device.

A further object of the present invention is to provide an improved means of locating and connecting components within a modular energy device.

Another object of the present invention is to provide an improved architecture for a modular energy device combining fuel cells to increase the output and power efficiency by using minimal fuel and oxidants.

Another object of the present invention is to provide a novel anode and cathode configuration for use in the modular energy device combining fuel cells to more efficiently use the fuel and oxidant necessary to create the electrical reaction.

A further object of the invention is to provide an improved architecture for a modular energy device for an automobile.

SUMMARY OF THE INVENTION

To achieve the foregoing objects, the present invention comprises a commercially usable modular energy device for combining fuel cells and a method for producing such a modular energy device. The modular energy device includes a pair of injection molded hard plastic end plates, a plurality of hard plastic bi-plates, and at least two side plates all interconnected via a snap and lock mechanism. The modular energy device includes a trough for supplying fuel to the anode side of the fuel cells or MEA's (membrane electrode assemblies) and a trough to supply the oxidant to the cathode side of the fuel cells or MEA's. The device further includes a metallic compression plate for each end of the modular energy device, a positive and negative current conductor, a first and second gasket, and a plurality of fuel cells or MEA members where the electro chemical reaction takes place. The end plate, the bi-plates and the side plates are all injection molded. The current conductor and current collectors are cut into the components of the assembly. The components are located and secured via a snap and lock configuration.

One advantage of the modular energy device is that it is light weight and more economically manufactured than previous systems.

Another advantage of the present invention is its components are easily interchangeable or replaceable.

Still another advantage of the modular energy device is its modularity, and the potential for adding additional modules to increase the energy output.

A further advantage of the modular energy device is its more efficient use of the fuel and oxidant and the generation of electrical energy.

Other objects, features and advantages of the present invention will be readily appreciated as the same becomes better understood after reading the following description taken in conjunction with the accompanying drawings.

BRIEF DESCRIPTION OF THE DRAWINGS

FIG. 9 is an alternate embodiment of the end plate.

DESCRIPTION OF THE BEST MODE AND PREFERRED EMBODIMENT(S)

Figure 1:
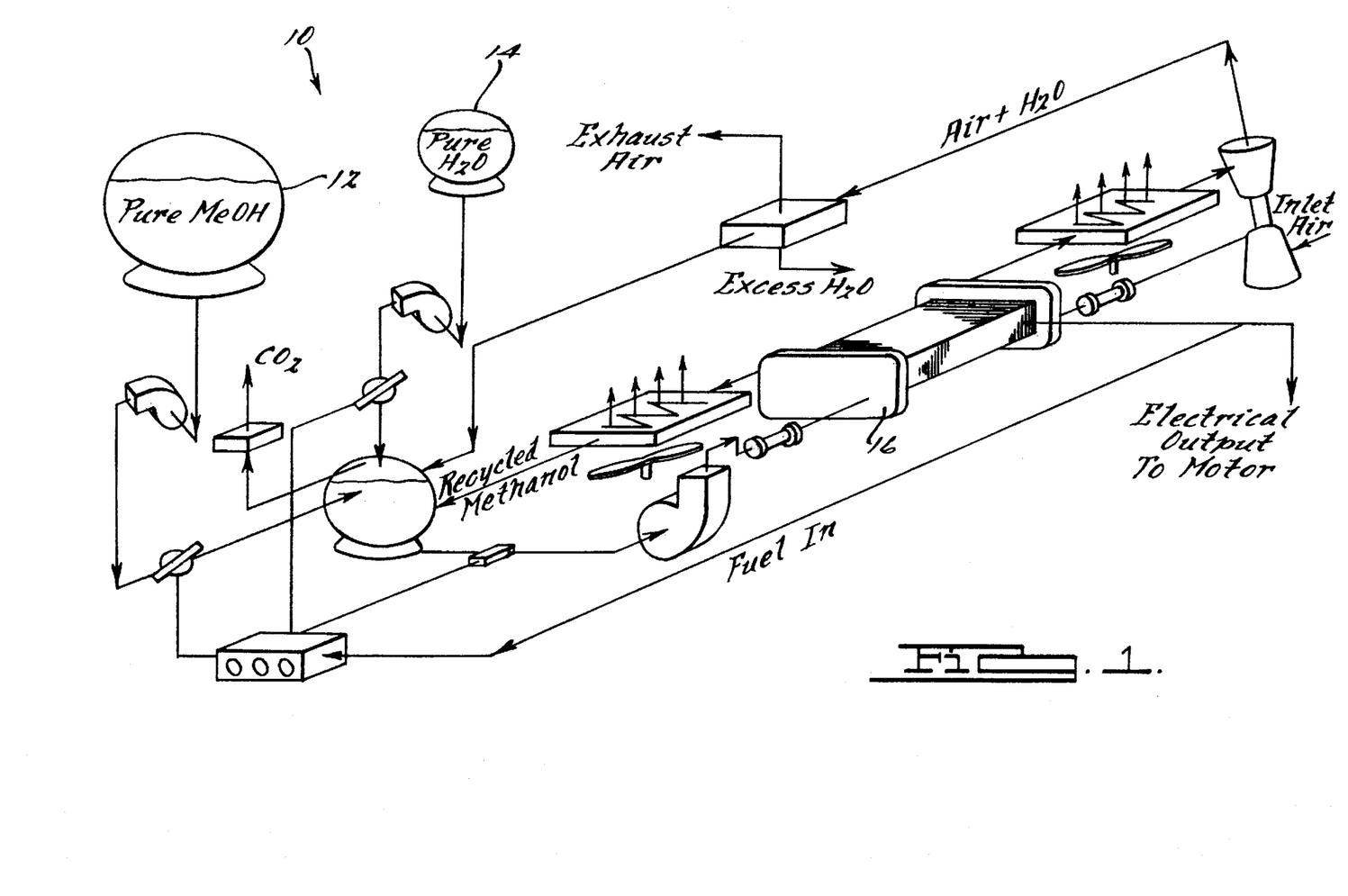
FIG. 1 is a schematic of a complete fuel system.

Referring now to FIG. 1, the basic components of the fuel system 10 are shown. The fuel system 10 is a direct methanol liquid feed system which uses methanol, water and oxygen to create an electro-chemical reaction at a fuel cell or MEA 32, thus creating electrical current which is stored and removed for use in driving motors or other electrical applications. The system 10 includes a tank 12 which stores pure methanol and a tank 14 which stores pure water. These two tanks are combined via a pump and valve system into a three percent methanol water solution. The methanol water solution is then pumped into a filter which is placed within the modular energy device 16. The modular energy device 16 also includes a trough for the oxidant (air) to be supplied to the cathode side of the modular energy device. The modular energy device will create electrical potential when exposed to the fuel (methanol and water) and oxidant and remove electrical potential for use in driving a motor and/or other device. The byproducts of the reaction are water and a small amount of carbon dioxide, which is exhausted. The water is recycled through a recycler and mixed back into the circulation tank to maintain the three percent methanol fuel mixture. An electrical controller controls the amount of methanol being placed within the circulation tank from the fuel source such as a fuel tank of an automobile. The entire fuel system 10 is a closed system which reuses the water which is a byproduct of the reaction in the electro chemical circuit, except for the intake of air and the exhausting of the small amount of $CO_2$.

FIGS. 2 THROUGH 15 show the modular energy device 16 in various forms. The electro chemical reaction takes place within the modular energy device 16. This reaction creates creates a current which is collected and then transferred to an electric motor for use in driving an automobile or other device. One modular energy device 16 is constructed by using a series of end plates 22, bi-plates 24, gaskets 30, current conductors 28, fuel cells or MEA's (Membrane Electrode Assemblies) 32 and compression plates 20 for the outer shells. The fuel cells are connected in series to produce the total voltage available from the modular energy device system 16.

Figures 2, 3:
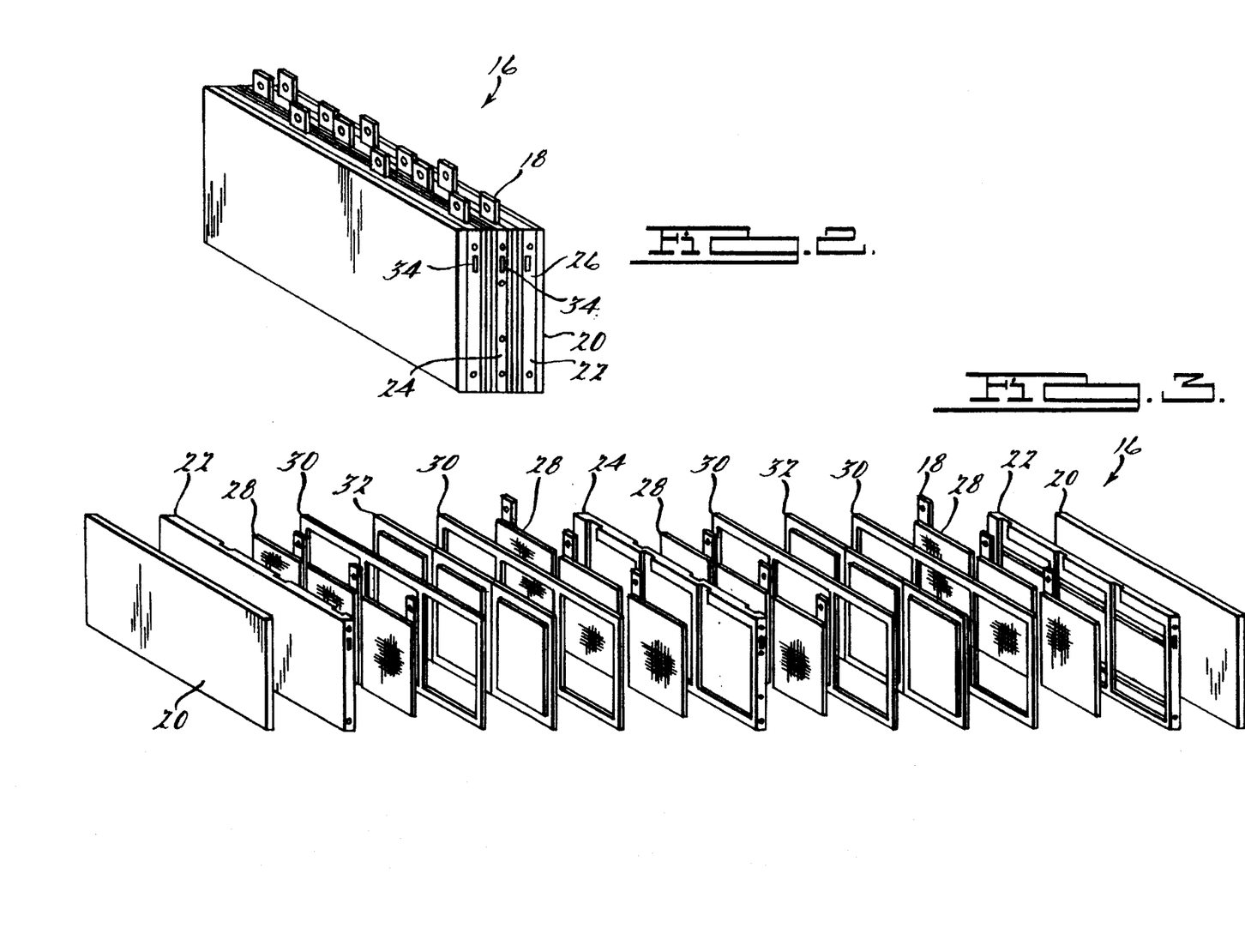
FIG. 2 is a view of the modular energy device of FIG. 1.
FIG. 3 is an exploded view of the modular energy device of FIG. 1.
Figure 4:
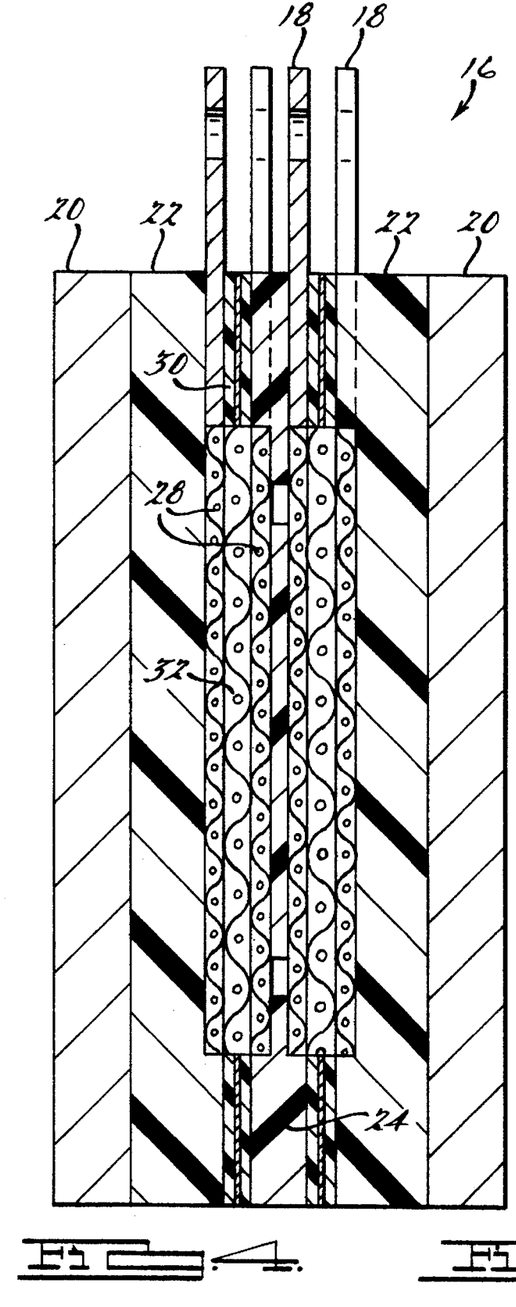
FIG. 4 is a cross section view of the modular energy device of FIG. 1.

The preferred embodiment may include a modular energy device configuration as follows: an end plate 22 is placed at the end of one modular energy device 16, within the end plate 22 is placed three current conductors 28 each within a separate recessed area. A gasket 30 is laid on top of the current conductors 28 and on top of the gasket 30 is placed three fuel cells or MEA's 32 in their respective slots. Another gasket 30 will then be placed on top of the MEA's 32. Three current conductors 28 are then placed against the MEA 32 and gasket 30. A bi-plate 24 is then placed on top of the three current conductors 28 within the recessed areas of the bi-plate 24. Three current conductors 28 are placed in their respective recessed areas on the opposite side of the bi-plate 24. A gasket 30 is then placed on top of the three current conductors 28 and three MEA's 32 will be placed against the current conductors 28. Another gasket 30 is placed on top of the MEA's 32, and another set of current conductors 28 are placed on top of the gasket 30. Another bi-plate 24 is then placed upon the current conductors 28 and another set of current conductors 28 is placed on the opposite side of the bi-plate 24. This configuration will continue until three bi-plates 24 are placed between two end plates 22. A compression plate 20 is then placed at the outer edges of the end plates 22. The compression plate 20 can be made of any metal material but are preferably made of aluminum.

Figures 7, 8:
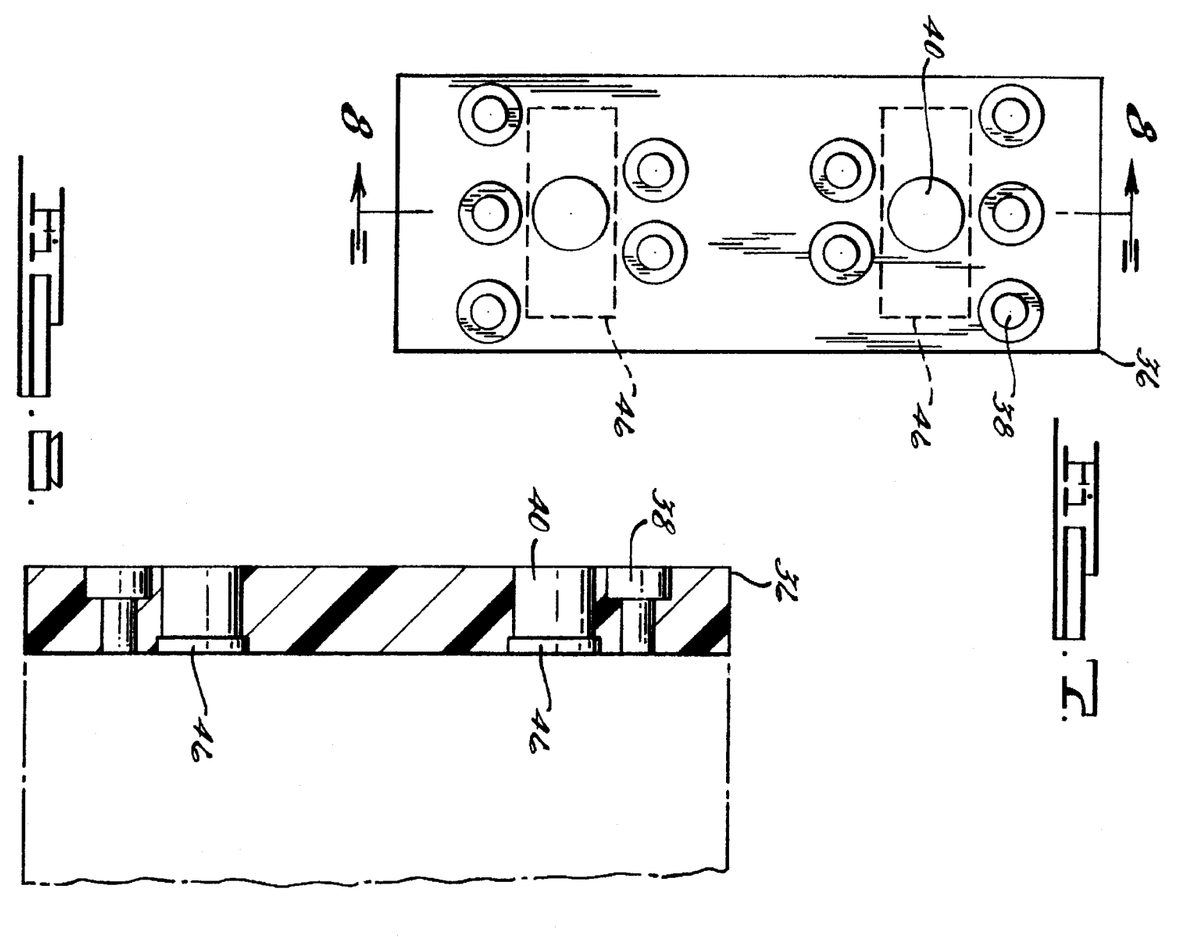
FIG. 7 is a view of the side plate shown in FIG. 1.
FIG. 8 is a cross section of the side plate of FIG. 7 taken along B—B.

After the initial end plates 22 and bi-plates 24 have been assembled, an optional side plate 36 is connected to each of the far ends of the end plate 22. The side plates 36 include means for connecting to the ends of the end plates 22 and two fuel delivery holes 40 for delivering the fuel and air to the bi-plates 24 and end plates 22. The preferred embodiment includes three bi-plates 24 and two end plates 22 but any number of corresponding bi-plates 24 and end plates 22 can be connected to form a modular energy device 16 of any desired size.

It should be noted that the bi-plates 24 may be configured to hold any number of MEA's 32 in a variety of configurations. The bi-plate 24 is comprised of a sufficiently electrically impermeable material to prevent current leakage between MEA's 32 on either side of the bi-plate 24 as well as those on the same side of the bi-plate 24.

Figures 13, 14, 15:
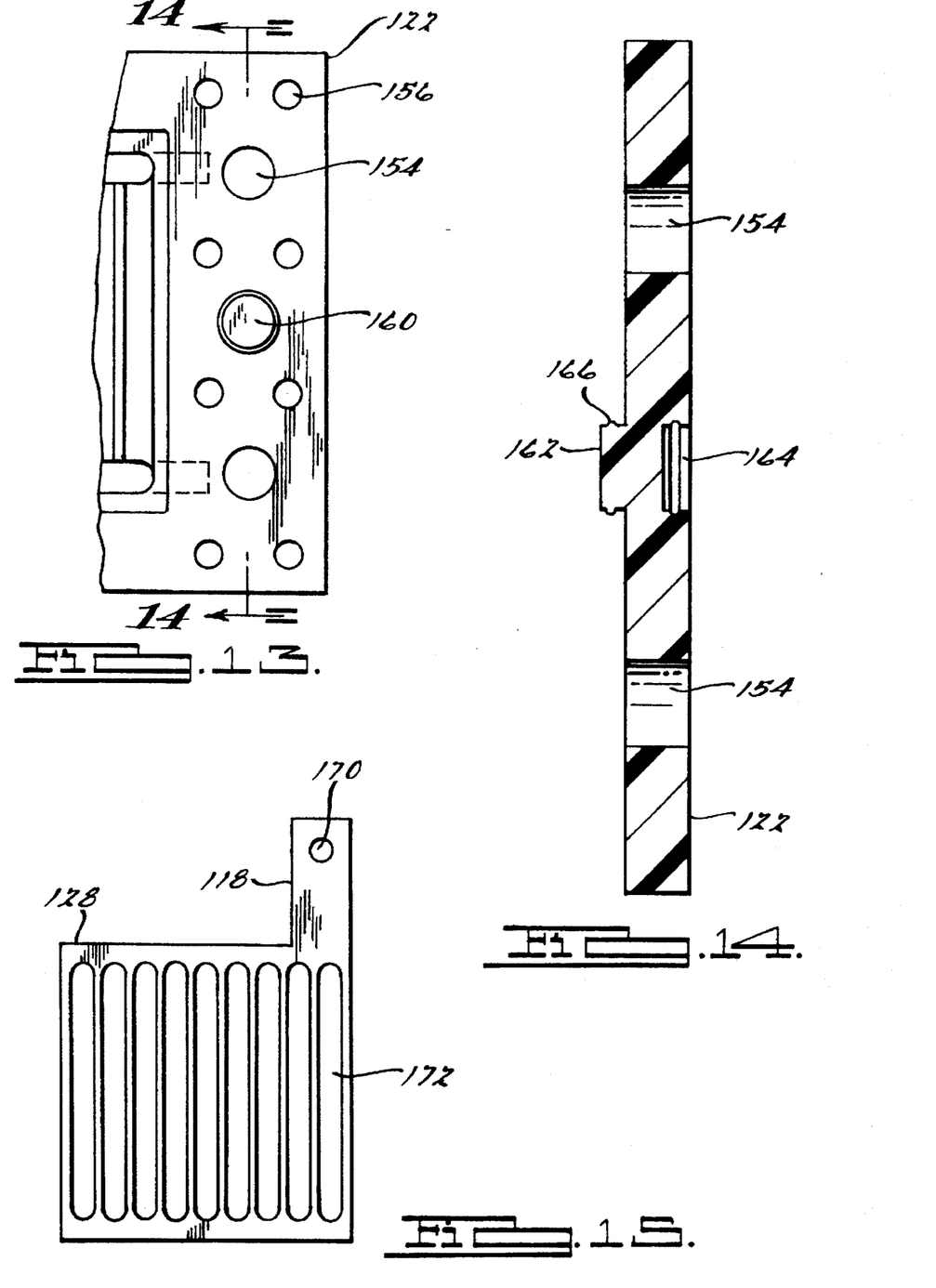
FIG. 13 is a view of the locating mechanism for a modular energy device as shown in FIG. 11.
FIG. 14 is a cross section view of the locating system of FIG. 13 taken along C—C.
FIG. 15 is a view of the current conductor for a modular energy device as shown in FIG. 11.

FIG. 13 shows the use of protrusions and indentations for use in properly and quickly locating the plates and securely fastening the plates together to form a modular energy device 16. A protrusion or projection 162 which has a circular shape are placed at various locations on the end plates 122 and bi-plates. The protrusion 162 has an annular ring structure 166 approximately one third of the way from its top end to securely fasten itself within a receiving indentation area 164. Opposite the nob or protrusion 162 is a mating indentation 164 which has the same general shape and outline as the protrusion 162. The indentation 164 area also has a ring-like groove which receives the ring 166 on the protrusion 162 in a snap and lock engagement. The snap and lock configuration improves the structural integrity of the modular energy device 16. Alternatively, protrusions and indentations may be used without the locking configurations. The protrusions assure the proper alignment of the modular energy device 16 in exact position and orientation during assembly and provide structural support to stiffen the modular energy device 16.

Figure 5:
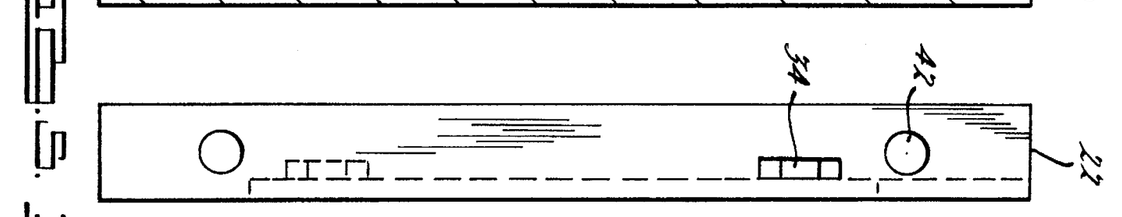
FIG. 5 is a cross section of the end plate shown in FIG. 1.

FIG. 5 shows the end plate 22 configuration. The preferred embodiment of the modular energy device has an end plate 22 which has a rectangular like cross section. However, it should be noted that the end plate 22 can be of various shapes and sizes. The preferred end plate 22 is made of a CELCON 90 plastic material by Hoescht Celanese, however, any plastic or plastic composite material capable of being injection molded may be suitable for the end plates 22. The end plate 22 also includes a channel or trough 34 for supplying fuel to the anode side of the fuel cell or MEA 32. The channel 34 runs from one end of the plate to the end of the last fuel cell or MEA 32. Another channel or trough 34 is formed on the end plate, beginning at the opposite end of the first channel and extending to the end of the last MEA 32. One side of the end plate 22 has a smooth texture, while the opposite side of the end plate 22 has three recessed areas proportionally spaced on the side. The recessed areas have a square shape with a projectile extending from the top. This space is used to hold the current conductors 28 and the MEA's 32. The first and second channels 34 run through the top portion of the recessed areas and the bottom portion of the recessed areas to provide the fuel and oxidants necessary to create the necessary chemical reaction.

The end plate 22 also includes orifices 42 for use in connecting the side plates 36 to the modular energy device 16. The end plate 22 also includes the indentation or protrusion, which can be made of any shape other than the round shape shown. The channel or trough 34 which runs in opposite directions from either end of the end plate 22 has a rectangular cross section but it may have a cross section of any other shape depending on the needs of the system. The preferred embodiment includes three recessed areas for storing the fuel cells or MEA's 32 and current conductors 28, however any number of recessed areas may be placed upon any size or shape fuel cell end plate 22. The plates 22 and 24 may be injection molded and machined to provide the orifice 42, protrusion 160, indentation 164 and channel or trough 34. As shown in FIG. 2, the plates are assembled, the channels 34 form conduits for the contained flow of the fuels to the fuel cell or MEA 32.

Figure 6:
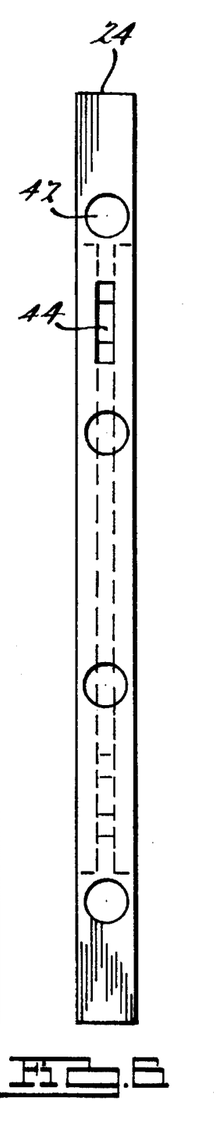
FIG. 6 is a cross section of the bi-plate shown in FIG. 1.

FIG. 6 shows a bi-plate 24. The bi-plate 24 is an injection molded device which is preferably made from CELCON 90, however any plastic or composite material which is capable of being injection molded may be used to form the bi-plates 24. The bi-plate 24 has a rectangular shape, however any shape may be used for making the modular energy device 16 depending on where the modular energy device 16 is used. The side of the bi-plate 24 includes three recessed areas which preferably have a square shape, however any shape may be used, and a projectile 18 in a square shape extending from the top of the bi-plate 24. On the opposite side of the bi-plate 24 is also formed with three recessed areas which are located directly across from and in relation to the three recessed areas on the opposite side. Thus, alternating electrodes will protrude from the top of the bi-plate 24. The bi-plate 24 is formed with a fuel channel 44 through the top portion of the three square recessed areas. This provides a path for the delivery of fuel to the anodes of the fuel cells or MEA's 32. Another fuel channel 44 is provided on the opposite end of the bi-plate 24 and at the lower portion of the square recessed areas, which is used to supply the oxidant to the cathode side of the fuel cells or MEA's 32. Locating nobs or protrusions and mating indentations are located on opposite sides of the bi-plate 24 which mate with corresponding components on an abutting bi-plate 24 and/or end plate 22. The ends of the bi-plates 24 also include orifices 42 for use in securely fastening the side plates 36 to the end of the modular energy device 16 after construction is complete.

FIG. 7 illustrates optional side plates 36, the preferred embodiment does not use side plates, attached to each side of the modular energy device 16 after the assembly of the fuel cells within the modular energy device 16. The side plate 36 connects securely and holds the bi-plates 24 and end plates 22 together in a compact rectangular shape. It must be noted that the preferred embodiment has a rectangular shape, however the end plates 22 can take the form or shape of whatever shape the modular energy device 16 must be to fit its environment. The side plate 36 is formed with a series of orifices 38 corresponding to each end plate 22 and/or bi-plate 24. A larger circular orifice 40 is located within a rectangular orifice 46 which is used to feed the fuel into the fuel channels (34, 44) of the end plates 22 and bi-plates 24. A pump mechanism will propel the fuel throughout the device. There is a circular orifice and smaller square rectangular orifice at the top and bottom edges of the side plates 36. These orifices will match directly with the fuel channels (34,44) on the bi-plates 24 and end plates 22. The side plates 36 are secured to each end of the modular energy device 16, such as with circular set screws.

Figure 11:
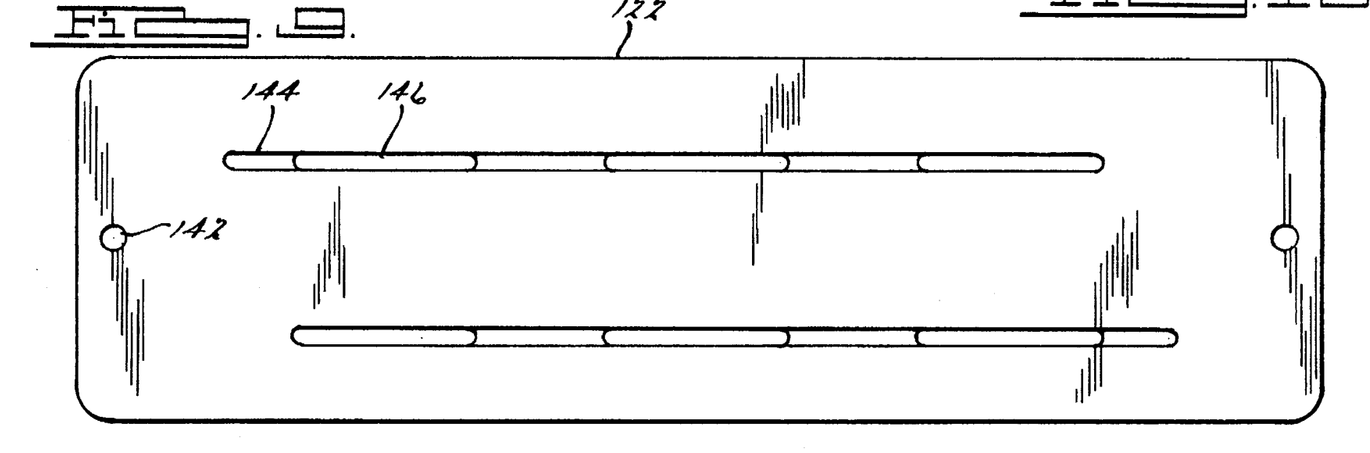
FIG. 11 is an alternate embodiment of the bi-plate.
Figures 11, 12:
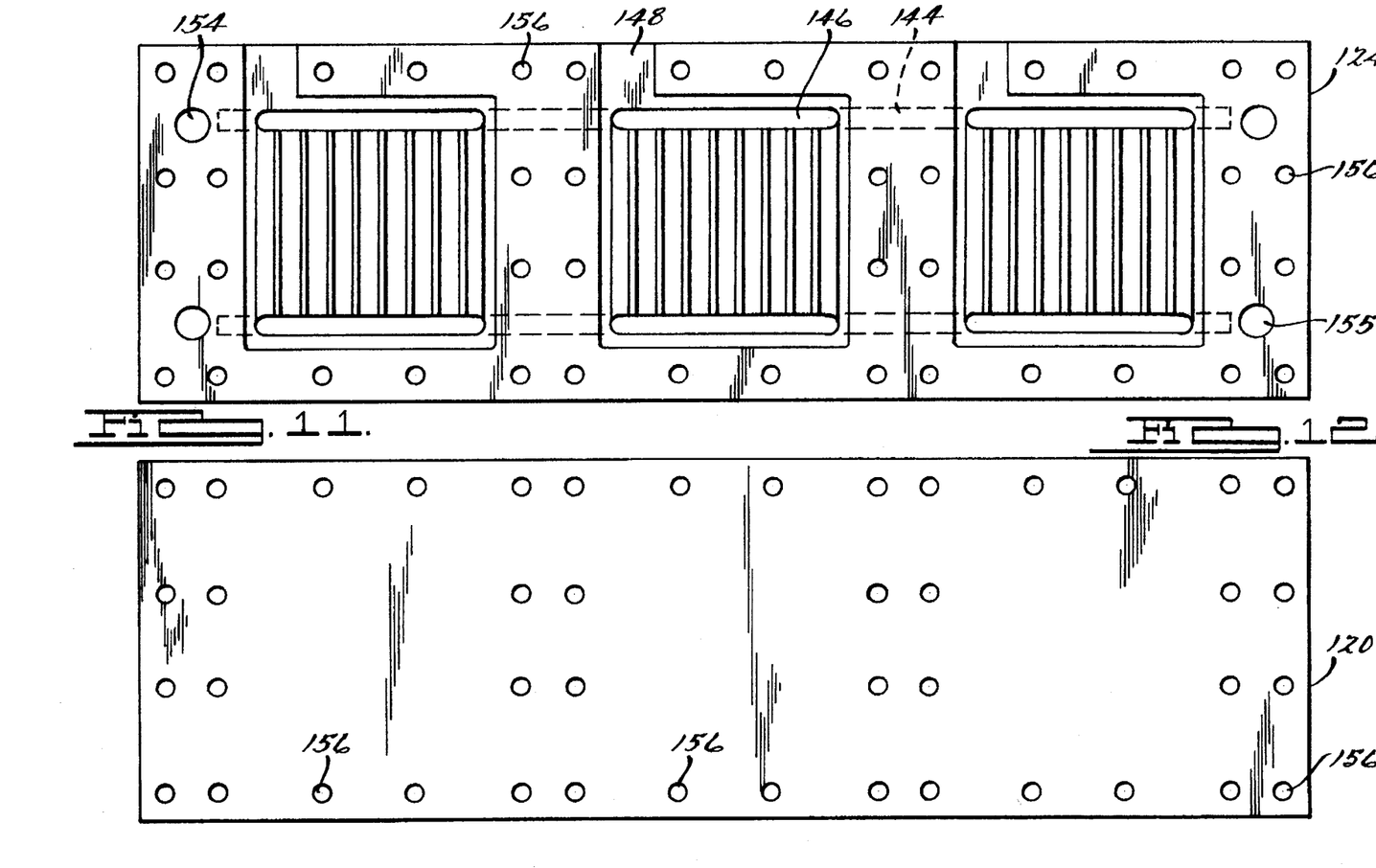
FIG. 12 is a compression plate.

The modular energy device 16 also includes a compression plate 120 for both the front and rear of the completed modular energy device 16. The compression plate 120 is shown in a generally rectangular shape but it should be noted that any other shape may be used for the design of the modular energy device 16 and that the compression plate 120 can be formed to match the modular energy device shape. The compression plates 120 are preferably made of a 6061-T651 type 100 aluminum plates (⅜ inch stock) however, any other type of hardened material which is ridged and will keep the modular energy device 16 together may be used in place of the aluminum. The compression plates 120 also have a plurality of orifices 156 which correspond with the orifices 156 on the bi-plates 124 and end plates 122 of the modular energy device 16 in order to securely fasten the completed modular energy device 16 into a compact unit.

In operation, the methanol and water are separately stored in conventional storage containers, such as fuel tanks, and are combined through a controlled mixing operation to form a three percent solution of methanol fuel, it should be noted that any other percentage solution of methanol may be used, which is caused to flow (as by pumping) through the first channel 34 of the modular energy device 16 and onto the anode side of the fuel cells or MEA's 32. The methanol will react with the coating on the anode, which in the preferred embodiment comprises a platinum-ruthenium coating. However, it should be noted that other coatings may be used and that other types of anodes may also be used. The fuel cell or MEA 32 of FIG. 3 uses a PEEK membrane from JPL, however other membranes such as NAFION and/or other types of membranes may be used to further the proton exchange. The methanol chemically reacts when it comes into contact with the platinum-ruthenium anode, which sheers the hydrogen groups off of the methanol and through the fuel cell or MEA 32 to the cathode side. Two electrons from the hydrogen are then attracted to the anode and travel through the anode up through the circuit down to the cathode. The hydrogen protons then travel across the fuel cell or MEA 32 to complete the circuit and create the energy which is stored or sent to a motor.

The cathode side of the fuel cell or MEA 32 is exposed to the fuel channel filled with air drawn from the exterior. The oxygen in the air reacts with the platinum coating and gives off two oxygen electrons to the cathode. These oxygen electrons will then combine with the hydrogen protons which are coming through the fuel cell or MEA 32 to form water, the byproduct of the reaction. This water is then collected and reused in the closed cycle of the modular energy device 16 through a pumping means. The electrical reaction will continue to occur as long as the fuel cell or MEA 32 stays wet with fuel. Other types of fuel other than methanol may also be used but methanol is the preferred choice because of its availability, storage characteristics, and tolerable chemical byproducts.

The current conductors 28 extend from the top of the modular energy device 16 and are connected to a distributor cap-type system, which receives the energy released from the reaction and transfers the electrical energy to an electrical motor and/or storage for use later on in the automobile. As long as methanol is present the reaction will occur and voltage will be produced for use in driving the automobile. One fuel cell or MEA 32 shown in FIG. 3 produces approximately 300 milliamps and 5 milli-volts. Whereas one modular energy device 16 shown in FIG. 2 produces approximately 6 volts, numerous devices 16 may be connected in series to increase the voltage output of the modular energy device 16. The modular energy device 16 has an optimal operating temperature of approximately 90° C., but can operate at a much larger range of temperatures.

Because of the unique construction described above the modular energy device 16 may be easily assembled, and is particularly well suited for mass-assembly techniques or for automated assembly. The locator pins 162 provide physical confirmation that the parts have been correctly aligned and located for assembly, and provides the requisite holding force while other components or modules are added to the assembly. The fasteners similarly assure proper alignment and may all be secured from a single direction during assembly. The entire process may be done by computer controlled robotic devices.

Another embodiment of the modular energy device 16 includes a current collector 128 which is made from graphite. It should be noted that other materials are available for use as the current collector 128 in the modular energy device 16. The graphite current collector 128 has a generally square shaped body and a generally rectangular shape member 118 extending from the top corner of the body. The rectangular extension 118 is used as a lead to be connected to a distributor cap type system. The rectangular extension 118 may also have a circular aperture 170 within its body. The main square like body portion of the current collector 128 includes a plurality of oblong orifices 172 within the main body frame. The oblong orifices 172 are aligned in a vertical manner reaching from the top of the square body section to near the bottom of the square body section. In the embodiment nine oblong orifices 172 are placed along the square body section of the current collector 128. The oblong structures 172 are used to create a better electrical connection between the anode or cathodes, thus making the collection of current more efficient and the overall fuel cell more efficient.

Current conductors 28 are made by stamping a material in a square shape with a protrusion member 18 extending out of the top of the modular energy device 16. The current conductor 28 can be made of copper, graphite or any other known conductive substance which will attract electrons. The fuel cell or MEA 32 assembly is made of an anode, which comprises TORAY paper coated with platinum-ruthenium, and a cathode which is also a TORAY or carbon paper coated with platinum. The coating is applied to the anode and cathode by a sputtering technique. The platinum-ruthenium anode and platinum cathode are then pressurized into a layer of PEEK membrane and/or any other type of suitable membrane such as NAFION. A gasket 30 is also made out of a rubber substance and/or any naturally occurring substance.

Figure 10:
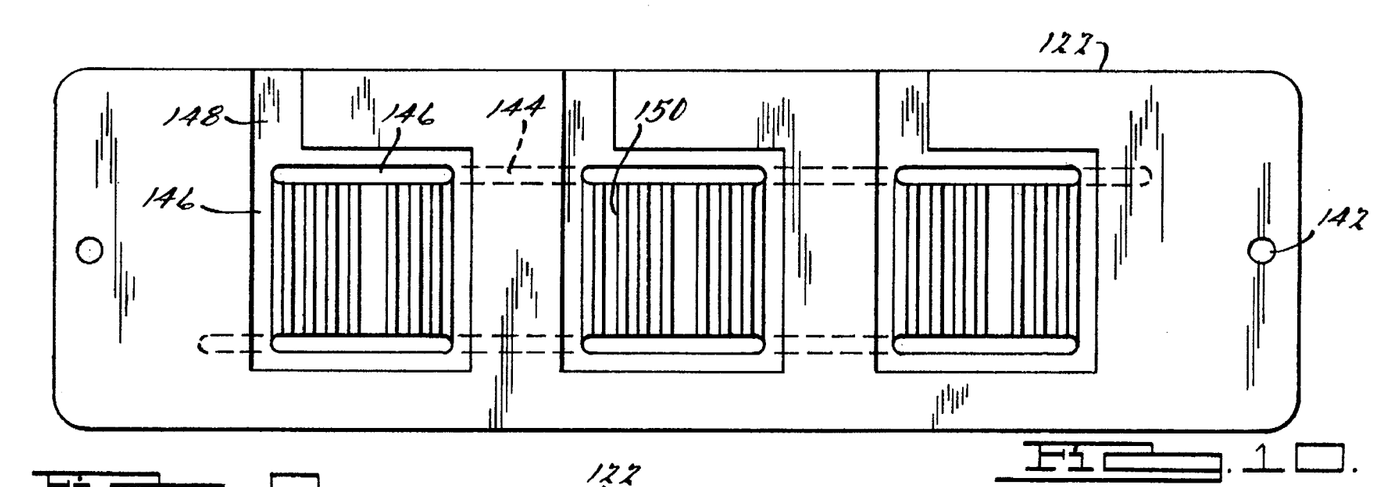
FIG. 10 is an alternate embodiment of the end plate.

Another embodiment of the modular energy device 16 includes the following: end plates 122 and bi-plates 124 similar to the corresponding components described above. The end plate 122 has a generally rectangular shape which has a smooth surface on one side. On the opposite side there are located three proportionally spaced recessed areas which have the shape of a square body and a rectangular appendage 148 extending from the top corner of the body. In this embodiment the three recessed areas have a plurality of channels 150 placed within their bodies. The channels 150 are located in a vertical plane which allows for the fuel to flow along the entire area of the fuel cell or MEA 32. There are approximately nine channels 150 located within each separate recessed area. The channels 150 have a rectangular shape. The channels 150 increase the amount of fuel which comes into contact with the fuel cells or MEA's 32. Also in this embodiment, at the top and bottom edges of the square body section, horizontally located is an oblong trough 148. On the inner side of the end plate 122 is a generally integral rectangular channel 144 which is located in the plate so as to correspond with the three oblong fuel channels 146. The fuel channel 144 delivers the methanol to the fuel cells or MEA's 32. The fuel then flows through the channels 150 of the end plate 122 to a similar fuel channel on the bottom, which will return the methanol fuel for reprocessing. It should be noted that the fuel may also be pumped from the bottom of the modular energy device 16 and exit through the top. On the end of the fuel channel 144 is a fuel inlet orifice 154 which is used to supply the fuel for the reaction to the fuel channel 144. The orifice 154 is located on the sides of the end plate 122 and bi-plates 124. The upper fuel inlet orifice is for the incoming fuel while the lower fuel outlet orifice 155 is for the exiting fuels. A pumping mechanism is used to move the fuel throughout the device 16.

After the end plates 122 and bi-plates 124 are stacked into a modular energy device 16. The fuel orifices 154 all cooperate and align with each other to form a conduit to the fuel channels 144. A fuel channel 144 of the bi-plate will provide the necessary fuel to six MEA's or fuel cells 32. This arrangement increases the efficiency of fuel flow through the system. The same process occurs on the oxygen side of the fuel cell 32. There is also proportionally located on the end plate a plurality of orifices 156 to be used in securely fastening the end plates 122 and bi-plates 124 into one modular energy device 16.

Figure 16:
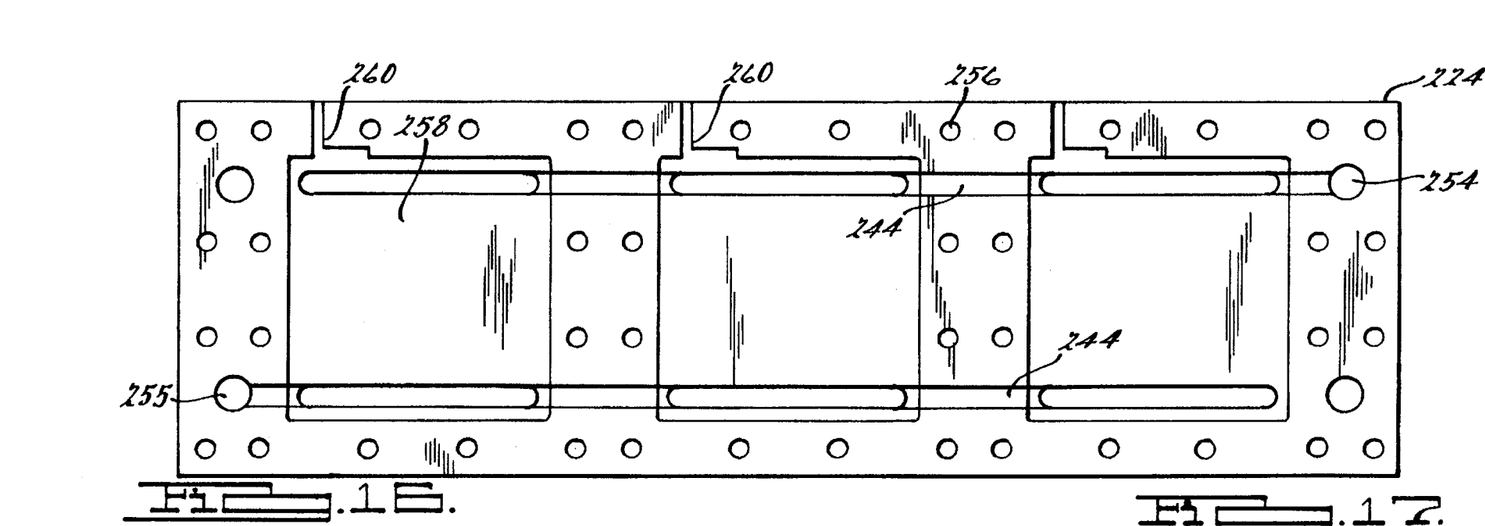
FIG. 16 is another alternate embodiment of the bi-plate.
Figure 17:
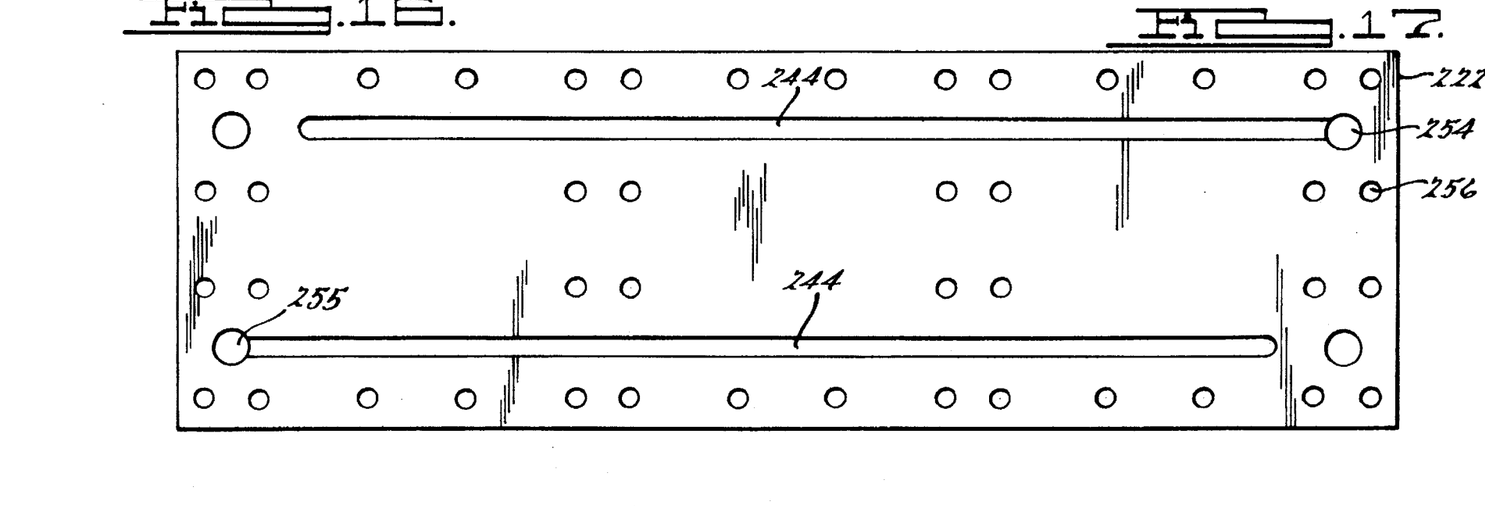
FIG. 17 is another alternate embodiment of the end plate.

FIGS. 16 & 17 show another embodiment of the end plate 222 and bi-plate 224. The end plate 222 and bi-plate 224 are similar to the previous embodiment. However, this embodiment differs from the others in that the recessed areas 258 have a smooth surface without any vertical channels. The recessed area 258 also includes a L shaped appendage 260 through which an electric connector will extend out of the modular energy device 16. In this embodiment, the electrical connector is a flexible wire which is connected to the collection system.

Figure 18:
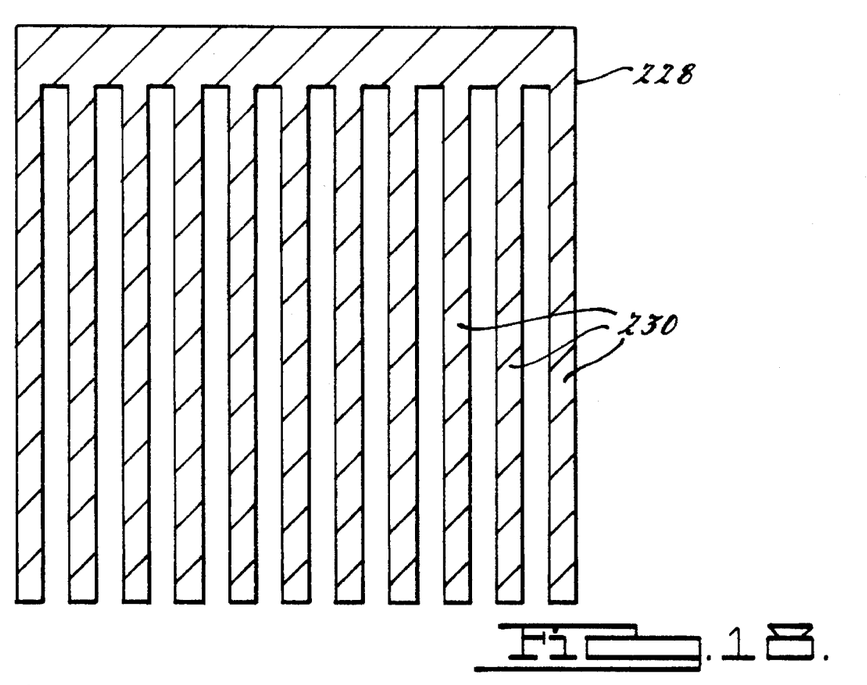
FIG. 18 is an alternate embodiment of the current collector.
Figure 19:
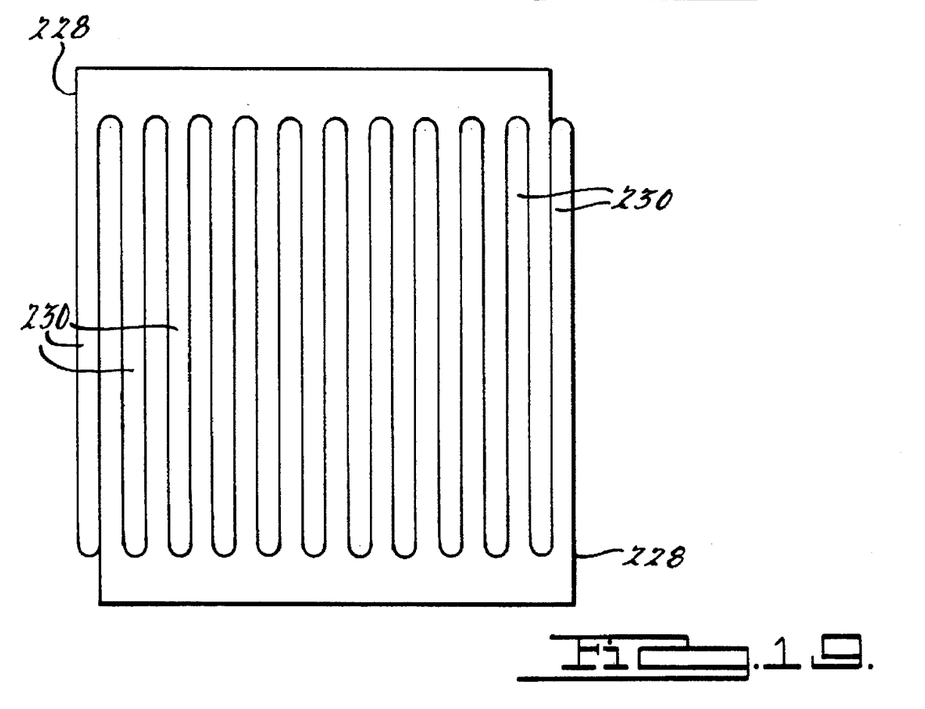
FIG. 19 is another alternate embodiment of the current collector.

FIG. 18 & 19 show another embodiment for the current collector 228. The current collector 228 has the same general shape as the recessed areas 258 of the end plate 222 and bi-plate 224. The current collector 228 includes a plurality of extensions 250, which form vertical channels in the current collector 228. In this embodiment there are eleven extension members 230. The extension members 230 form channels which help to move the fuel along the fuel cells or MEA's. The extensions 230 of the current collector 228 may have a rectangular shape, an oblong shape or any shape which will fit the system. The current collectors 228 may also be manufactured such that two current collectors 228 may be cut from the same square piece of graphite or other material being used. This reduces the amount of material and time to generate a current collector 228.

The modular energy device 16 maybe remotely located from a second modular energy device that it is electronically connected to. This will allow the modular energy device 16 to be placed throughout an automobile to evenly distribute the weight of the system.

The present invention has been described in an illustrative manner. It is to be understood that the terminology which has been used is intended to be in the nature of words of description rather than of limitation.

Any modifications and variations of the present invention are possible in light of the above teachings. Therefore, within the scope of the appended claims, the present invention may be practiced otherwise than as specifically described.

What is claimed is:

1. A modular energy device for combining fuel cells for use in a fuel system, said modular energy device comprising:

a pair of end plates each having a plurality of integral fuel and oxidant channels and a fuel and oxidant inlet orifice in communication with said fuel and oxidant channels, at least one recessed area on the interior faces of said end plates, said fuel and oxidant channels communicating with said recessed areas;

a plurality of plastic biplates having at least one recessed area on each face of said biplate, located to correspond with said recessed area of an end plate or other biplate abutting said face, and a fuel and oxidant inlet orifice in communication with said integral fuel and oxidant channels, and fuel and oxidant channels communicating with said recessed areas, said biplates and said end plates are made of electrically insulative material;

at least one fuel cell located within a recessed area of each biplate, said fuel cell includes an anode, a membrane which is made of a plastic material connected to said anode, and a cathode on the opposite side of said membrane;

a current collector having an electrical lead extending from a corner of said current collector, said current collector having a plurality of oblong orifices;

a sealing gasket inserted between said biplates and said end plates; and a plurality of mating protrusions and indentations located on abutting end plates and biplates for aligning said end plates and said biplates, said protrusions are generally circular in cross section and have an annular ring located circumferentially there upon, and said indentations have a corresponding circular cross section for receiving said protrusions and a circular groove located therewithin for receiving said annular ring, said protrusions and said indentations mate in a snap and lock engagement.

2. The modular energy device of claim 1 wherein said protrusions and indentations are proportionally placed upon the side of said bi-plates and end plates, said protrusions and indentations are placed such that they are mirror images of each other so that the end plates or bi-plates may be assembled in said system in a plurality of orientations.

3. A modular energy device for combining fuel cells for use in a fuel system, said modular energy device includes:

a pair of end plates;

a plurality of bi-plates held in proximity to said end plates;

at least one elongated locator member, said end plates and bi-plates having cooperatively located means for receiving said locator member such that said end plates and bi-plates are precisely aligned when assembled; and projections and indentations which are proportionally located upon the side of said bi-plates and end plates, said projections and said indentations are placed such that they are mirror images of each other, said projections have an annular ring, said indentations have a circumferential groove, said projections and indentations have a snap and lock engagement, said snap and lock engagement allows for assembly from a single direction.

4. The modular energy device of claim 3 further including a pair of compression plates connected to outer side of said end plates.

5. The modular energy device of claim 3 wherein said biplates and end plates include a plurality of recessed areas having a plurality of channels located in a vertical plane with respect to the length of said end plates and biplates of said recessed areas, said vertical channels for use in delivering a fuel to a fuel cell, said recessed areas further including a plurality of oblong horizontally placed with respect to the length of said end plates and biplates apertures which correspond to a fuel channel located at the top and bottom of said recessed areas.

6. The modular energy device of claim 3 further including an anode, a membrane which is made of a plastic type material which is connected to said anode, and a cathode which is placed on the opposite side of said membrane, wherein said anode, said membrane and said cathode compress together.

7. The modular energy device of claim 3 wherein said bi-plates and end plates are made of an injection molded plastic material.

8. A modular energy device for combining fuel cells for use in a fuel system, said modular energy device includes:

a pair of end plates;

a plurality of bi-plates held in proximity to said end plates;

a plurality of recessed areas located on an interior side of said end plates and on both sides of said bi-plates, said recessed areas include a plurality of vertically located channels, said recessed areas having a plurality of oblong horizontally placed apertures which correspond to a fuel channel of said end plate or bi-plate, a fuel inlet orifice in communication with said fuel channel of said end plates; and a locator member for aligning said bi-plates and said end plates to each other, said locator member includes a projection protruding from the side of an end plate or bi-plate, said projection having an annular ring protruding from its side surface received in a locking relationship by an indentation for another end plate or bi-plate, said indentation further having a ring-like groove within its side wall in order to receive the annular ring of said projection, said projection and indentations having a snap and lock engagement which increases structural integrity of said modular energy device.

9. The modular energy device of claim 8 further including a current collector having a protrusion extending from a corner of said current collector, said current collector having a plurality of oblong orifices.

10. The modular energy device of claim 8 wherein said projection and indentation are proportionally located on the side of said bi-plates and said end plates, said projection and indentation are located such that they are mirror images of each other.

* * * * *